W. E. HALE.
ROPE SHEAVE CARRIER.
APPLICATION FILED MAY 14, 1921.
1,437,301. Patented Nov. 28, 1922.
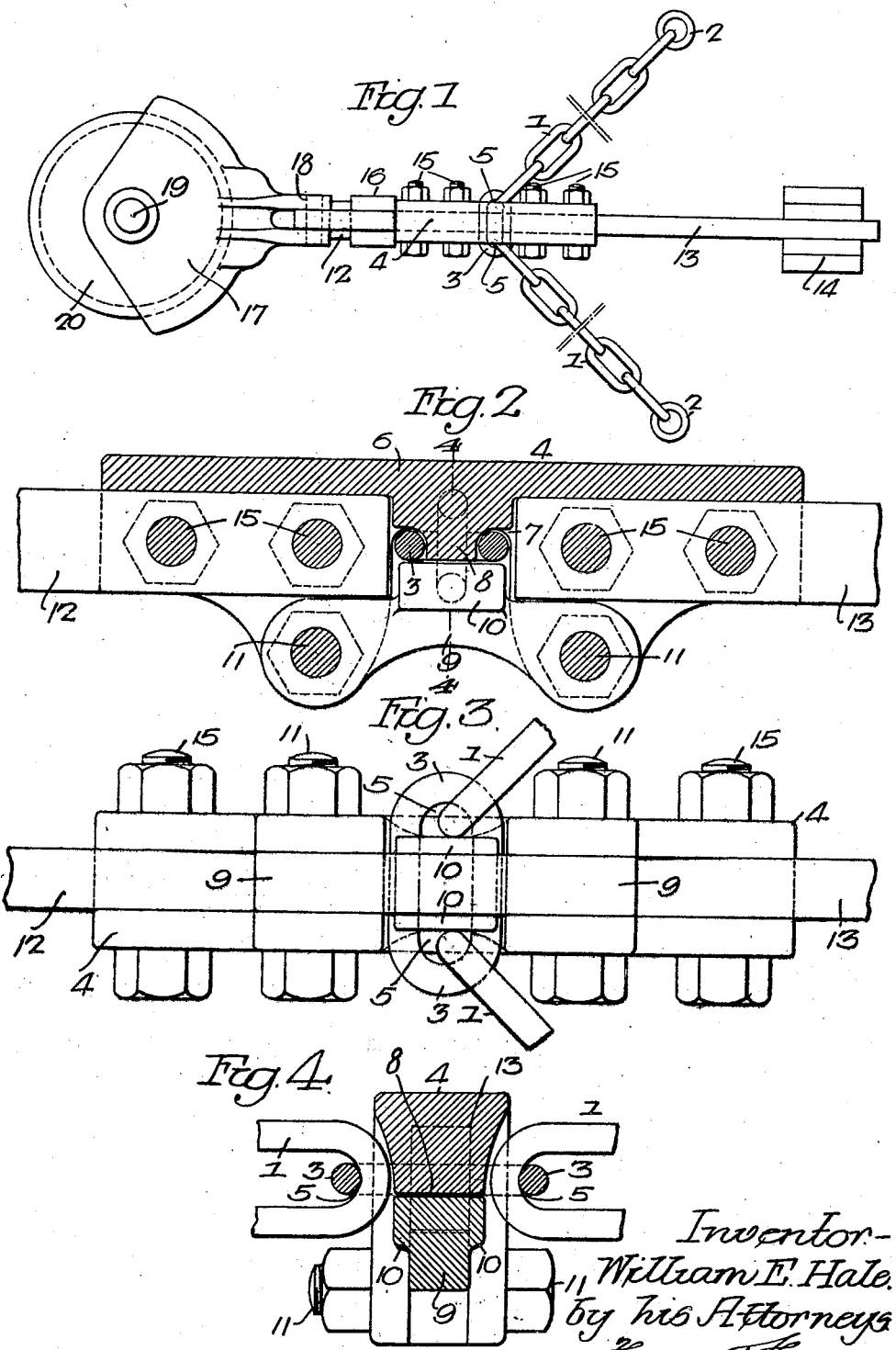

Patented Nov. 28, 1922.

1,437,301

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

ROPE-SHEAVE CARRIER.

Application filed May 14, 1921. Serial No. 469,721.

*To all whom it may concern:*

Be it known that I, WILLIAM E. HALE, a citizen of the United States, residing in Fort Washington, Montgomery County, Pennsylvania, have invented certain Improvements in Rope-Sheave Carriers, of which the following is a specification.

The object of my invention is to improve the construction of a balance sheave so as to utilize one of the links of the chain as a direct means of attaching the sheave structure to the suspending chains.

This object I attain in the following manner, reference being had to the accompanying drawings, in which: Fig. 1 is a plan view of my improved balanced sheave; Fig. 2 is an enlarged side view, partly in section, showing the means of attaching the sheave structure to the chain; Fig. 3 is an enlarged inverted plan view of a portion of the sheave structure shown in Fig. 2; and Fig. 4 is a sectional view on the line 4—4, Fig. 2.

Referring to Fig. 1, 1 is the chain, which, in the present instance, has rings 2, which are attached to posts, or other suitable supports. The chain is formed of a series of ordinary links and one of these links 3 is firmly secured to the sheave structure 4 so as to form eyes 5. The sheave structure consists of a central section 6, recessed at 7 to receive the link 3. This central section has a projection 8, which extends into the space between the side members of the link so as to hold it firmly in position.

9 is a locking block having a portion 10, which bears against the under side of the link and clamps the link firmly to the central section. The central section and the locking block are both perforated for the passage of bolts 11, which secure the block to the central section. The central section is recessed at each end and projecting into one recess is a bar 12 carrying the sheave and into the other recess a bar 13 on which is the counterbalance weight 14. The bars are held to the central section by bolts 15, but it will be understood that other fastenings may be used to secure the bars to the central section and also to secure the locking block to the central section.

Swiveled to the bar 12, in the present instance, is a frame 16 to which the side members 17 are attached by pins 18. These side members form the bearings for the spindle 19 on which the grooved sheave 20 is mounted.

By the above construction, it will be seen that the sheave can turn on its swivel and the weight 14 will balance the weight of the sheave so as to hold it in substantially a horizontal position at all times, thus preventing the rope chafing on the members 17.

By making the central section in the manner shown and utilizing the locking block, an ordinary stock chain can be employed to suspend the sheave structure, thus avoiding unnecessary special fixtures for this purpose.

I claim:

1. The combination in a sheave structure, of a supporting chain consisting of a series of links; a recessed central section forming the body of the sheave structure, the recess being formed to receive one of the links of the chain; a clamp block extending into the recess and arranged to clamp the link of the chain to the central section; a bar secured to each end of the central section; a sheave carried by one bar; and a balance weight carried by the other bar.

2. The combination of a sheave structure consisting of a central section recessed to receive a chain link and having a projection arranged to extend in the space between the side bars of the link; a chain having a link adapted to the recesses in the central section; a clamp block for holding the link in position; bars secured to the central section; and a sheave carried by one bar and a counterweight carried by the other bar.

3. The combination in a sheave structure, of a central section recessed to receive the side bars of a link; a chain, one of the links of the chain being mounted in the recess of the central section; a clamp block for holding the link of the chain rigidly to the central member; bolts securing the clamp block to the central member; a bar secured to each end of the central member; and a sheave carried by one bar and a balance weight carried by the other bar.

WILLIAM E. HALE.